United States Patent
Amano et al.

(10) Patent No.: US 7,953,790 B2
(45) Date of Patent: May 31, 2011

(54) SESSION INFORMATION INHERITING METHOD AND APPARATUS

(75) Inventors: Tomio Amano, Yokohama (JP);
Hirokazu Izumidate, Kasukabe (JP);
Satoru Nunoya, Ichikawa (JP);
Masahiro Ikarashi, Yachiyo (JP)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 10/389,507

(22) Filed: Mar. 14, 2003

(65) Prior Publication Data

US 2003/0187871 A1    Oct. 2, 2003

(30) Foreign Application Priority Data

Mar. 14, 2002  (JP) .................................. 2002-070489

(51) Int. Cl.
*G06F 15/16* (2006.01)

(52) U.S. Cl. ........................................ 709/203; 709/227

(58) Field of Classification Search ................... 709/200, 709/227, 228, 229, 203, 201
See application file for complete search history.

(56) References Cited

U.S. PATENT DOCUMENTS

| | | | | |
|---|---|---|---|---|
| 5,991,878 A * | 11/1999 | McDonough et al. | ............ | 726/9 |
| 6,098,093 A * | 8/2000 | Bayeh et al. | .................. | 709/203 |
| 6,369,840 B1 * | 4/2002 | Barnett et al. | ................ | 715/853 |
| 6,801,949 B1 * | 10/2004 | Bruck et al. | .................. | 709/232 |
| 7,082,532 B1 * | 7/2006 | Vick et al. | ..................... | 713/155 |
| 7,099,915 B1 * | 8/2006 | Tenereillo et al. | ............ | 709/203 |
| 7,177,945 B2 * | 2/2007 | Hong et al. | ................... | 709/238 |
| 7,340,532 B2 * | 3/2008 | Swildens | ...................... | 709/238 |
| 7,421,505 B2 * | 9/2008 | Berg | ............................. | 709/230 |
| 2002/0194262 A1 * | 12/2002 | Jorgenson | .................... | 709/203 |

* cited by examiner

*Primary Examiner* — Kevin Bates
*Assistant Examiner* — Bradford F Fritz
(74) *Attorney, Agent, or Firm* — Ronald A. Kaschak; Kevin P. Radigan, Esq.; Heslin Rothenberg Farley & Mesiti P.C.

(57) ABSTRACT

A method is disclosed to maintain session continuity between a browser and an initial server in a cluster when the browser is transferred from the initial server to a different server and returned thereafter to the original server.

6 Claims, 8 Drawing Sheets

| Cluster address | Dispatch rules |
|---|---|
| 192.168.1.0 | Dispatch to 192.168.0.1 and 192.168.0.2 evenly for each HTTP request |
| 192.168.1.1 | Dispatch to 192.168.0.1 as rule and to 192.168.0.2 when 192.168.0.1 is down |
| 192.168.1.2 | Dispatch to 192.168.0.2 as rule and to 192.168.0.1 when 192.168.0.2 is down |

Figure 8

| Internal cluster address | Cluster address as seen from browser side |
|---|---|
| 192.168.1.0 | 9.100.1.1/cluster0 |
| 192.168.1.1 | 9.100.1.1/cluster1 |
| 192.168.1.2 | 9.100.1.1/cluster2 |

SESSION INFORMATION INHERITING METHOD AND APPARATUS

TECHNICAL FIELD

The invention relates to handling session information for use on a Web, and more particularly to a method of inheriting the session information when a browser side is cooperatively directed from an original server site to another site and then restored to the original site.

BACKGROUND OF THE INVENTION

In recent years, along with the spread of businesses using the Web (World Wide Web) technologies, some applications have been developed in the form in which a plurality of Web sites provide cooperative services. For example, there is a scenario in which a user moves from a Web site of an insurance company to a site of a bank where the user receives a loan on security of one's insurance to make a payment, and then returns to the Web site of the insurance company again to continue the operation.

In a great number of application scenarios, when the user moves from site A to site B and then returns to site A (assumed A'), it is necessary that the session information be inherited from A to A'. Usually, the session information is stored in a memory or database on the server side, and a server application can access the session information for each user with the session ID transmitted from the browser as a key. The session ID is transmitted from the server to the browser in establishing a first session, and held as a cookie on the browser side.

However, in a Web application system constructed in combination with a load balancing server and an authentication server for a Single-Sign On (enabling all the permissible functions for a server or directory having the access right by making the user authentication once), there are some cases where the above session inheriting scheme may not operate.

Figure 6:
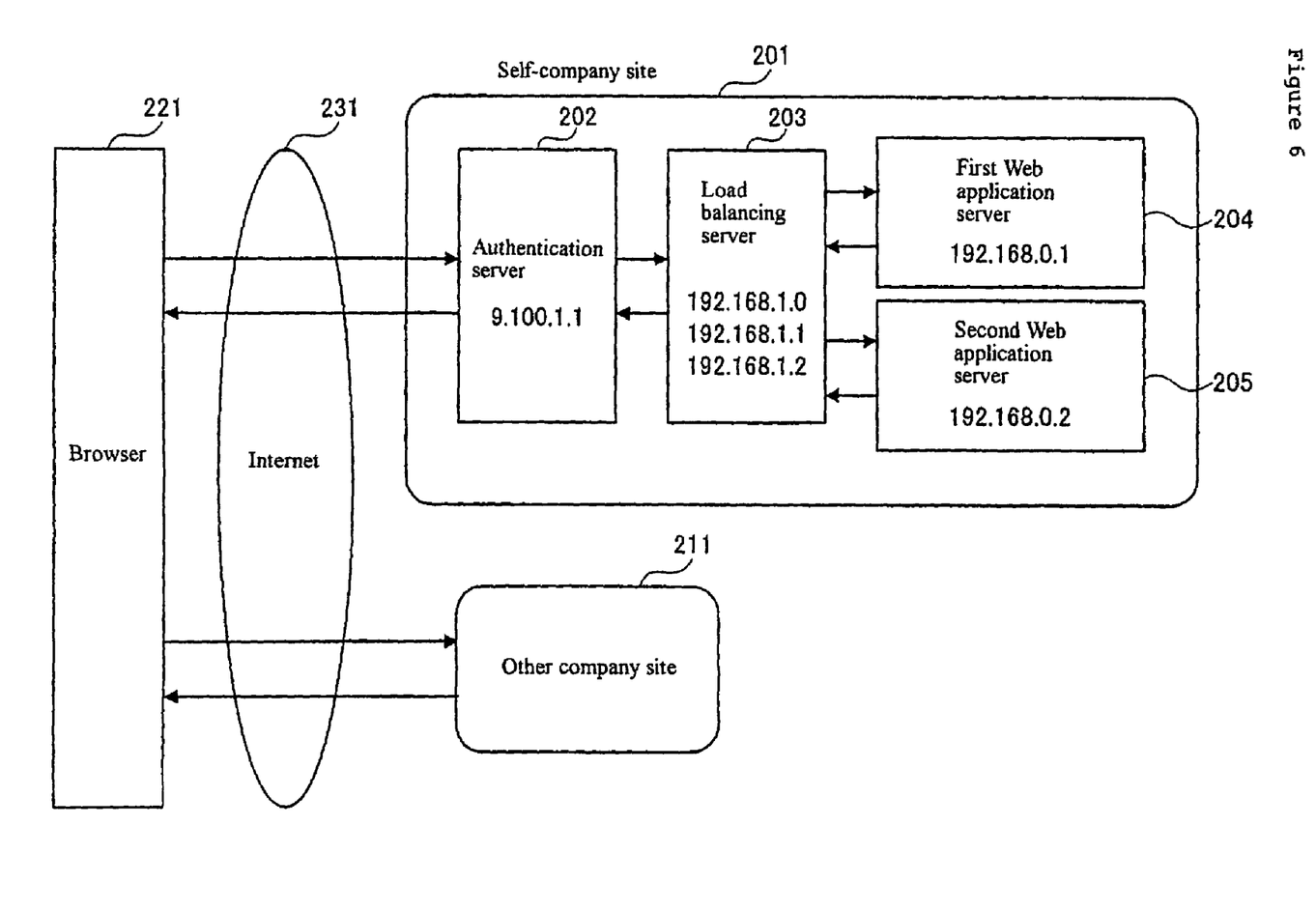
FIG. 6 is a diagram showing a configuration example in which there is the possibility that a scheme for inheriting the session may not function.

FIG. 6 is a diagram showing an exemplary configuration in which this problem may possibly occur. In an example of FIG. 6, a self-company site (site A) 201, the other company site (site B) 211, and a browser 221 are connected via the Internet 231. In this self company site 201, an authentication server 202 of reverse proxy type (controlling all the accesses via a proxy server for security purposes) and a load balancing server 203 are combined, in which a first Web application server 204 and a second Web application server 205 are shown as the application servers allocated to the load balancing server 203. It is assumed here that the authentication server 202 that accepts a request through the Internet 231 has an IP address of 9.100.1.1, and the first Web application server 204 and the second Web application server 205 that perform the actual processes have the IP addresses 192.168.0.1 and 192.168.0.2, respectively. The load balancing server 203 dispatches any one of three cluster addresses (virtual addresses accepted by the load balancing server 203) 192.168.1.0, 192.168.1.1 and 192.168.1.2 in accordance with the predetermined rules.

Figure 7:
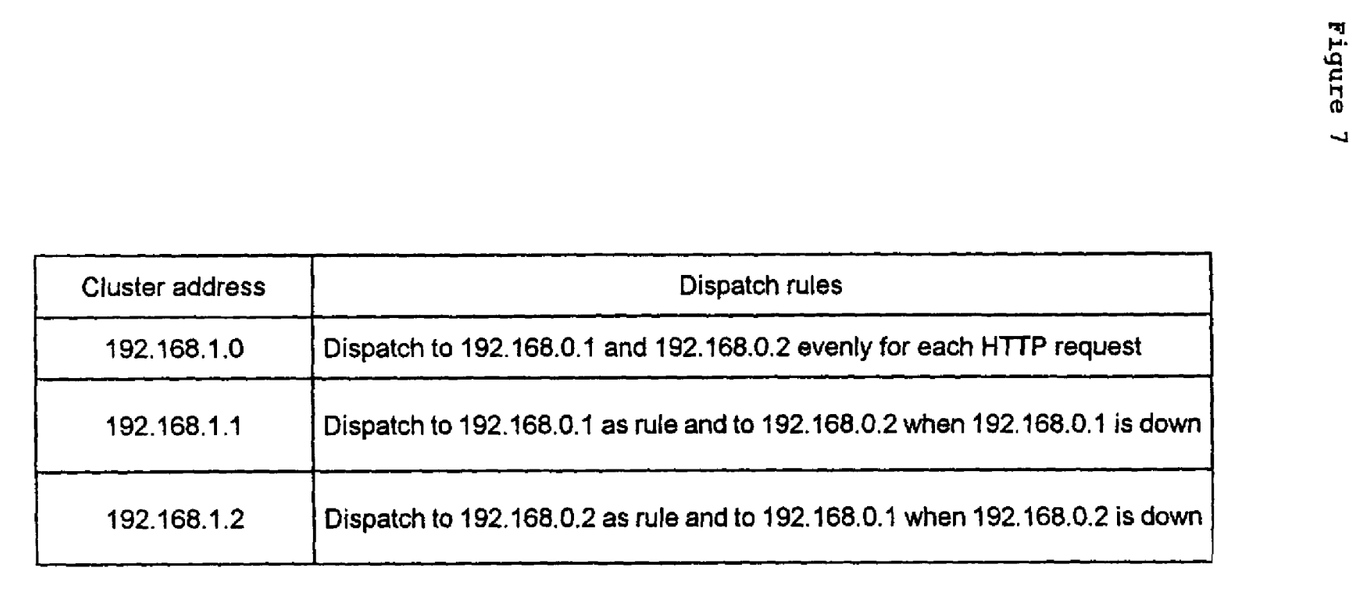
FIG. 7 is a table for listing rules of dispatching each cluster address.

FIG. 7 is a table for listing rules of dispatching each cluster address. Herein, the virtual cluster address 192.168.1.0 is dispatched to real address 192.168.0.1 and 192.168.0.2 uniformly for every HTTP request as a rule. Also, the virtual cluster address 192.168.1.1 is dispatched to 192.168.0.1 as a rule, or to 192.168.0.2 when it is determined that the real address 192.168.0.1 is down. Moreover, the virtual cluster address 192.168.1.2 is dispatched to 192.168.0.2 as a rule, or to 192.168.0.1 when it is determined that the real address 192.168.0.2 is down.

The address 9.100.1.1 of authentication server 202 is a public IP address. By pre-negotiation, or any desirable means, browser 211 also knows the URLs 9.100.1.1/cluster0, 9.100.1.1/cluster1 and 9.100.1.1/cluster2. These URLs are translated to site A's internal IP addresses 192.168.1.0, 192.168.1.1 and 192.168.1.2, respectively by the authentication server (reverse-proxy). And then requests to these internal addresses are all handled by the load balancer and dispatched to the back-end Web servers 192.168.0.1 or 192.168.0.2 as dispatching rules of each internal address. The URL 9.100.1.1/cluster0 is used for initial load-balancing, and requests to that URL are dispatched to Web servers 192.168.0.1 or 192.168.0.2 as load balancing suggests. The URLs 9.100.1.1/cluster1 and 9.100.1.1/cluster2 are used to fix the target Web server to maintain "sticky" sessions, and they directly access Web server 192.168.0.1 and 192.168.0.2, respectively (except when the target server is down).

The URLs 9.100.1.1/cluster1 and 9.100.1.1/cluster2 are returned to the client in the form of an embedded URL link by the Web server that handled the client's first request and established the session. Whether a client uses cluster1 or cluster2 depends on which Web server handled the client's first request.

A first request to a Web application server is transmitted from authentication server 202 via the cluster address 192.168.1.0, and dispatched to the real address 192.168.0.1 or 192.168.0.2 by load balancer 203. With a function of an HTTP server on the Web application server side, the request dispatched to the real address 192.168.0.1 is redirected to the cluster address 192.168.1.1 and the request dispatched to the real address 192.168.0.2 is redirected to the cluster address 192.168.1.2 (the response is once returned to the browser side and the request is automatically transmitted to the server side again). The "redirect" means that a HTTP server returns a response containing a Location response-header (defined in HTTP specification RFC2068) to a client, and the client automatically transmits a request according to the description of the Location response-header.

Figure 8:
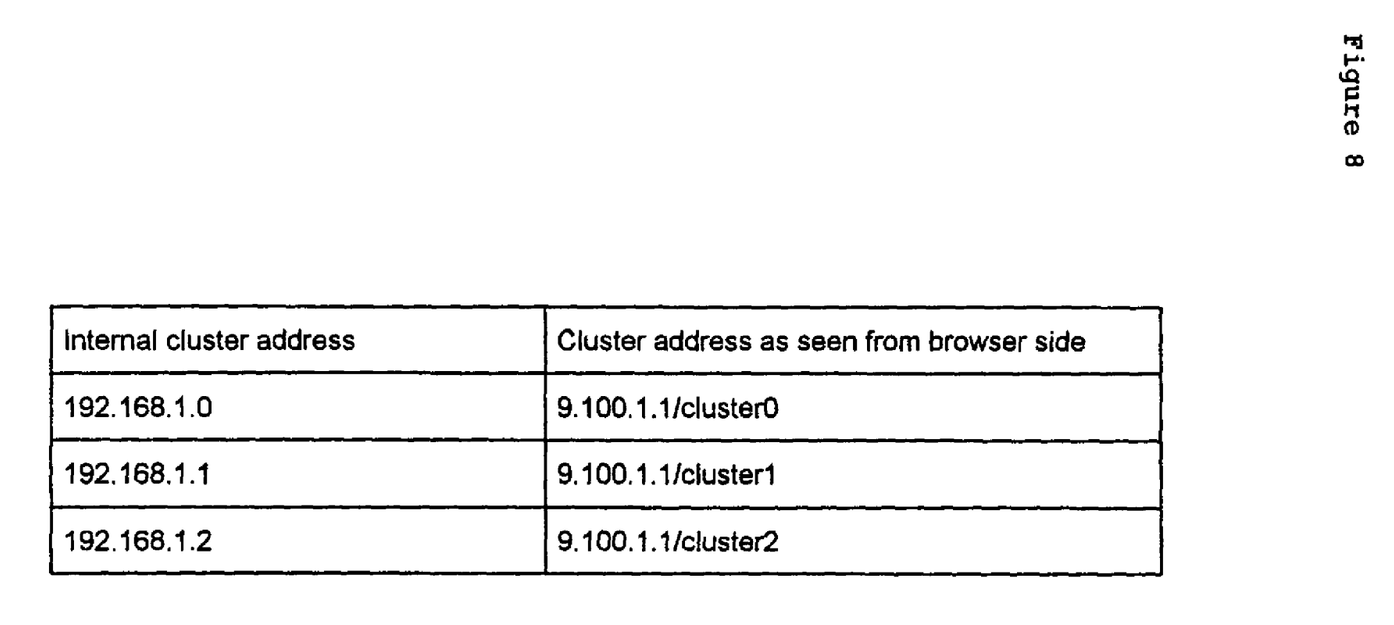
FIG. 8 is a table for listing a relationship between an internal cluster address and the cluster address as seen from the browser side.

The authentication server 202 accepts the requests which from a client at the three cluster addresses by making a conversion as shown in FIG. 8. This conversion is totally performed for the request URL from the browser 221 and the URL described in the HTML of the response. For example, in a case where there is a description of "/index.html" in an anchor tag in the response HTML, the cluster address might be converted into "/cluster1/index.html" and delivered to the browser 221. By performing this processing, an HTTP request from a certain user is dispatched into either the first Web application server 204 or the second Web application server 205 at a uniform probability at first. Since then, it is assured that the request from that user is dispatched (offset) to the same server, whereby the session information can be inherited while making load balancing. There is a method of identifying the user and dispatching or offsetting, using the IP address on the browser side, but this method is not effective in the case where a proxy like the authentication server 202 is placed at the front end with the configuration as shown in FIG. 6. In these cases, the source IP address of all incoming packets is the address of the proxy, not the original client. The load balancing server 203 regards all the requests as arriving directly from the authentication server 202, the user can not be distinguished.

Under the above environment, it is supposed that the user is piloted from site A of the self company site 201 to site B of the other company site 211 and back to site A' of the self company site 201 again. To pilot the user from site B to site A', it is necessary that the URL information for linking to site A' is described in the response HTML file from site B. It is common practice that the stationary URL (9.100.1.1/cluster0) of site A is informed in advance to site B 211 in cooperative relation to have it embedded in the HTML.

However, when the offset (the "offset" means that the request addresses from a client are fixed to either of 9.100.1.1/cluster1 or 9.100.1.1/cluster2, once after the first request is sent to 9.100.1.1/cluster0) is firstly made at site A, a cookie is created in connection with the Path information "/cluster1" or "/cluster2" and sent to the browser 221 in a response, and as for the requests to the URL with the Path information unmatched (a cookie created at a request to 9.100.1.1/cluster1☐☐is not sent to the server when a client send a request to 9.100.1.1/cluster2), the session ID is not sent to the server side (self company site 201) for security reasons. The "security reasons" is to avoid sending a cookie carelessly. Supposing that the user interacts with site A using an address 9.100.1.1/cluster1 and then makes a request to site A' at 9.100.1.1/cluster0 after moving to site B, the server application can not access the previous session information, even if this request is sent to the same Web application server as processed at site A. This is because the browser 221 determines that 9.100.1.1/cluster0 and 9.100.1.1/cluster1 are different transmission destinations, and does not transmit the cookie (session ID) employed in transactions with 9.100.1.1/cluster1 to the server side.

This problem occurs in combination of:
Authentication server method and security policy to be set up there
Load balancing method and configuration
Application scenario transferring from self site to other site to self site.

Though there is a technical configuration of authentication or load balancing in which this problem does not occur, the authentication or load balancing method is constrained by many other conditions (security policy of the entire company, performance request, specifications of other company products) before examining the adaptability with the individual application scenarios. There is a method of inheriting the file or data stored in the database on the Web application server side with the user ID as a key, but the individual packaging is required for each application.

The present invention has been achieved to solve the above-mentioned technical problems, and it is an object of the invention to provide a systematic method of solving a problem of inheriting the session information on the application server side when there are other sites interposed.

SUMMARY OF THE INVENTION

To attain the above object, the present invention, apart from an application (real application) for performing the actual processing, a first redirect application for accepting a first request for session and a second redirect application for accepting a request in getting back from an other site. The first redirect application and the second redirect application make a redirect process of returning a response to the browser side once, and automatically transmitting a request to the server side again, and return a response to the browser side. The browser side automatically transmits a request to the real application on the server side again, in accordance with a description in the response, without making the user aware of it. This invention enables the session information to be inherited by changing the cluster address in initiating the real application. Also, this invention has a feature of recording the cluster information (which cluster address is offset) required in getting back from the other site when firstly offsetting the session (before starting the session of the real application).

That is, the invention provides a method of inheriting the session information that is effective when a browser side is once piloted from a self site (FIG. 1, 10) using a load balancing server to another site (FIG. 1, 11), and back to the self site again, including a step of generating a redirect response by setting a cluster address to be redirected on the basis of the result of dispatching by the load balancing server, a step of setting the cluster information indicating the cluster address offset in an identification information file of the browser side, a step of transmitting the redirect response, a step of receiving a request for the cluster address from the browser side to execute a real application, a step of receiving a request containing the identification information file from the browser side piloted from the other site to the self site, a step of acquiring the cluster information contained in the received identification information file, a step of recognizing which cluster address is offset upon the previous request to the self site on the basis of the acquired cluster information, a step of describing the recognized cluster address in the redirect response, and a step of transmitting the redirect response with the cluster address described to the browser side. The "set in an identification information file" as used herein includes the forms set on the memory. The same applies in the following.

Also, the invention provides a method of inheriting the session information, including a step of receiving an HTTP request, a step of reading the cluster information to be redirected from a configuration file of an operating server, a step of generating a redirect response for initiating the real application employing the parameters received upon the HTTP request and the cluster information, a step of setting the cluster information as a cookie in the redirect response, a step of transmitting the redirect response to the browser side, a step of receiving a new HTTP request from the browser side piloted from the other site, a step of acquiring the cluster information that is set in the new HTTP request, a step of generating a new redirect response employing the parameters received upon the new HTTP request and the acquired cluster information, and a step of transmitting the new redirect response to the browser side. Moreover, the invention provides a method of inheriting the session information, including a step of checking whether or not the cluster information is embedded in a cookie for a received HTTP request, a step of generating a redirect response employing the cluster information, if the cluster information is embedded, or generating a redirect response employing the read cluster information read from a configuration file, if the cluster information is not embedded, a step of setting the cluster information or the read cluster information as the cookie in the redirect response, and a step of transmitting the redirect response. When the functions of the first redirect application and the second redirect application are implemented by a single redirect application, the session information can be inherited by performing the above steps.

On one hand, the invention provides an application server comprising a real application for processing a received HTTP request and returning a response, a first redirect application for generating a redirect response on the basis of the cluster information based on the first dispatching, and transmitting the redirect response by setting the cluster information in a cookie of the browser, the first redirect application being initiated prior to execution of the real application upon the dispatched HTTP request, and a second redirect application for receiving from the browser the cluster information which the first redirect application has set in the cookie, generating a redirect response on the basis of the cluster information and transmitting the generated redirect response, the second redirect application being initiated prior to execution of the real application.

Form a different viewpoint, the invention provides an application server comprising execution means for executing an actual application process upon a dispatched request, a first redirect processing means for performing a redirect processing by accepting a first request for session and returning a redirect response to the browser side, prior to execution of the execution means, and a second redirect processing means for performing a redirect process upon a request when the browser side is restored from the other site, and returning a redirect response to the browser side, prior to execution of the execution means.

Also, the invention provides an application server comprising execution means for executing a real application upon a dispatched request, redirect processing means for executing a redirect response on the server side, prior to execution of the execution means, to change the cluster address in initiating the real application to enable the session information to be inherited, recording means for recording the cluster information (e.g., information indicating which cluster address is offset when firstly offsetting the session) required in being restored from the other site, when firstly offsetting the session before starting the session for the real application.

On the other hand, the invention provides a Web site comprising an authentication server for making the authentication for a request from the browser, a load balancing server for dispatching the request via the authentication server, and a plurality of application servers provided to process the request dispatched by the load balancing server, wherein the application server comprises a real application for executing an application actually, a first redirect application for accepting a first request dispatched, and a second redirect application for accepting a request when the browser is restored from the other site, and wherein the first redirect application and the second redirect application perform a redirect processing before executing the real application to return a redirect response to the request to the browser.

Each of the above inventions can be grasped as a program for enabling a computer operable as an application server to implement the functions. The program may be provided in a storage medium storing the program in a computer readable form. The storage medium may be a floppy disk or a CD-ROM medium, for example, in which the program is read by a floppy disk drive or a CD-ROM reader, stored in a flash ROM and run. Also, the program may be provided via a network by a program transmission apparatus. This program transmission apparatus is provided in the server on the host side, for example, and comprises a memory for storing the program, and program transmitting means for transmitting the program via the network. Moreover, when the computer is provided to the customer, the program may be installed in a storage device.

As described above, with this invention, the problem of inheriting the session information when other sites are interposed can be solved.

DETAILED DESCRIPTION

The preferred embodiments of the present invention will be described below in detail with reference to the accompanying drawings.

Figure 1:
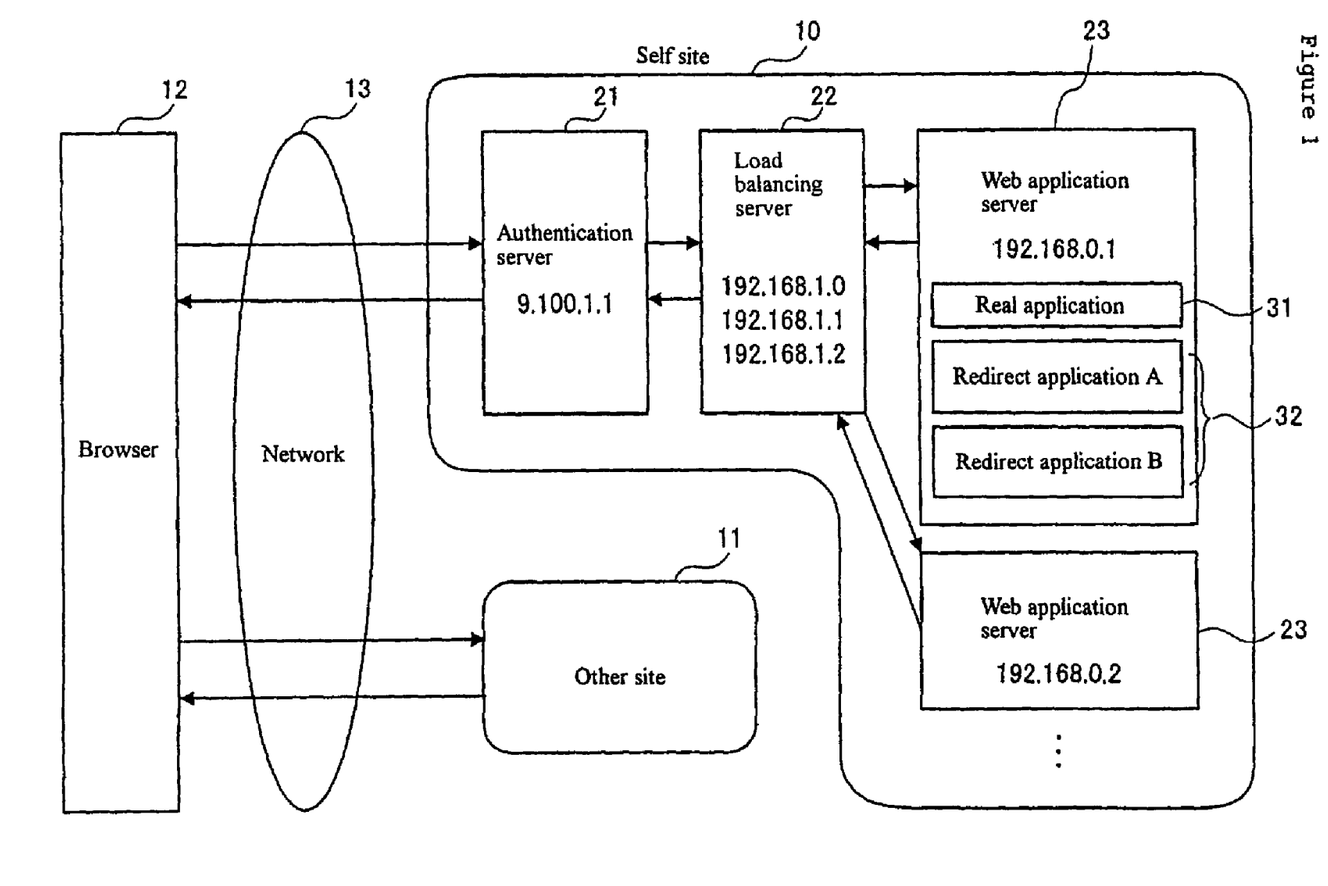
FIG. 1 is a block diagram showing an overall configuration of a network system according to an embodiment of the present invention.

FIG. 1 is a block diagram showing an overall configuration of a network system according to an embodiment of the present invention. The network system of FIG. 1 comprises a self site 10 for performing an application, another site 11 to be accessed by introducing a user from the self site 10 as an application scenario of this network system, and a browser 12 that is the user side software for gaining access to the self site 10 or the other site 11 via a network 13. The application scenario of this embodiment involves a situation in which the user (browser 12) is once piloted from the self site 10 to the other site 11, and back to the self site 10 again. Another scenario involves a situation in which a plurality of sites like the other site 11 are interposed while the browser 12 is restored to the self site 10.

The self site 10 comprises an authentication server 21 for making the authentication by collectively managing the name or password of the user who makes access to the self site 10 via the network 13, a load balancing server 22 for performing a distribution process to balance the application load, that is, a dispatching process of selecting an application with the higher priority from among the applications in ready state and allocating the processing to the application, and a Web application server 23 for performing each application. The self site 10 is provided with a plurality of Web application servers 23 which are dispatched by the load balancing server 22.

In the example of FIG. 1, the authentication server 21 presents only one IP address (9.100.1.1) to the outside. The load balancing server 22 has three cluster addresses (192.168.1.0, 192.168.1.1, 192.168.1.2) as the cluster address that is the virtual accepting address. The number of cluster addresses is increased when the number of Web application servers 23 is greater. The cluster addresses as seen from the side of the browser 12 are the same as shown in FIG. 8. The cluster addresses 9.100.1.1/cluster0, 9.100.1.1/cluster1, and 9.100.1.1/cluster2 transmitted from the side of the browser 12 are converted into three internal cluster addresses 192.168.1.0, 192.168.1.1 and 192.168.1.2, respectively by the authentication server.

Two Web application servers 23 as shown in FIG. 1 have the real addresses 192.168.0.1 and 192.168.0.2 assigned, for example, respectively. Each Web application server 23 comprises a real application 31 that is the application for performing the actual processing, and a redirect application 32 that is the application for making the processing called a redirect and once returning a response to the side of the browser 12. This redirect application 32 is composed of a redirect application A (first redirect application) that is the application for accepting a first request for a session and a redirect application B (second redirect application) that is the application for accepting a request in being restored from the other site 11. The browser 12 to which a response is returned by the redirect application 32 transmits a request to the real application 31 on the side of the server again in accordance with a description in the response automatically (without making the user aware of it).

The redirect application A offsets a dispatching object by setting the cluster address based on the result of dispatching the first request in the session in a redirect response. At the same time, the information (cluster information) indicating which cluster address is offset is set in a cookie on the side of the browser 12. The real application 31 is initiated via the offset cluster address so that the session ID for the real application 31 is set in the cookie on the side of the browser 12. Thereafter, as long as the request is transmitted via this cluster address, the session ID in the cookie is transmitted to the server to enable the session information to be inherited.

In the case where the browser is once piloted to the other site 11 and back to the self site 10 again, the other site 11 describes a link for initiating the redirect application B in the response HTML to be returned. The redirect application B receives the cluster information set in the cookie by the redirect application A from the browser 12 to know which cluster address is offset previously. The real application 31 can be initiated via this cluster address by having the cluster address described in the redirect response.

The redirect application A records the information of the cluster address that is offset before transferring to the other site 11. When being restored from the other site 11, the redirect application B decides which cluster address is to be offset, employing this information, changes the cluster address and initiates the real application 31. Thereby, the session information can be inherited in a transition from the self site 10 to the other site 11 to the self site 10.

It is known to use cookies to maintain a "stick" session to a server in a cluster after an initial step of selecting the server by load balancing. See, for example, U.S. Pat. No. 6,374,300; Method and system for storing load balancing information with an HTTP cookie. However, the method of this embodiment has the following features:

Enabling the session information to be inherited by changing the cluster address in initiating the application through the redirect processing.

Recording the cluster information (which cluster address is offset) required in being restored from the other site 11 at the first offset of the session (before the session of the real application 31 is started).

Implementing the load balancing server 22 itself with a simple packaging for performing the processing on the IP layer.

The cluster address means the IP address in a format of 192.168.0.1, for example. Also, the cluster information is the information for designating one of a plurality of cluster addresses. For example, the cluster information stored in the cookie to designate any one of three cluster addresses 192.168.0.1, 192.168.0.2 and 192.168.0.3. is one character taking the value of "A", "B" or "C".

Figure 2:
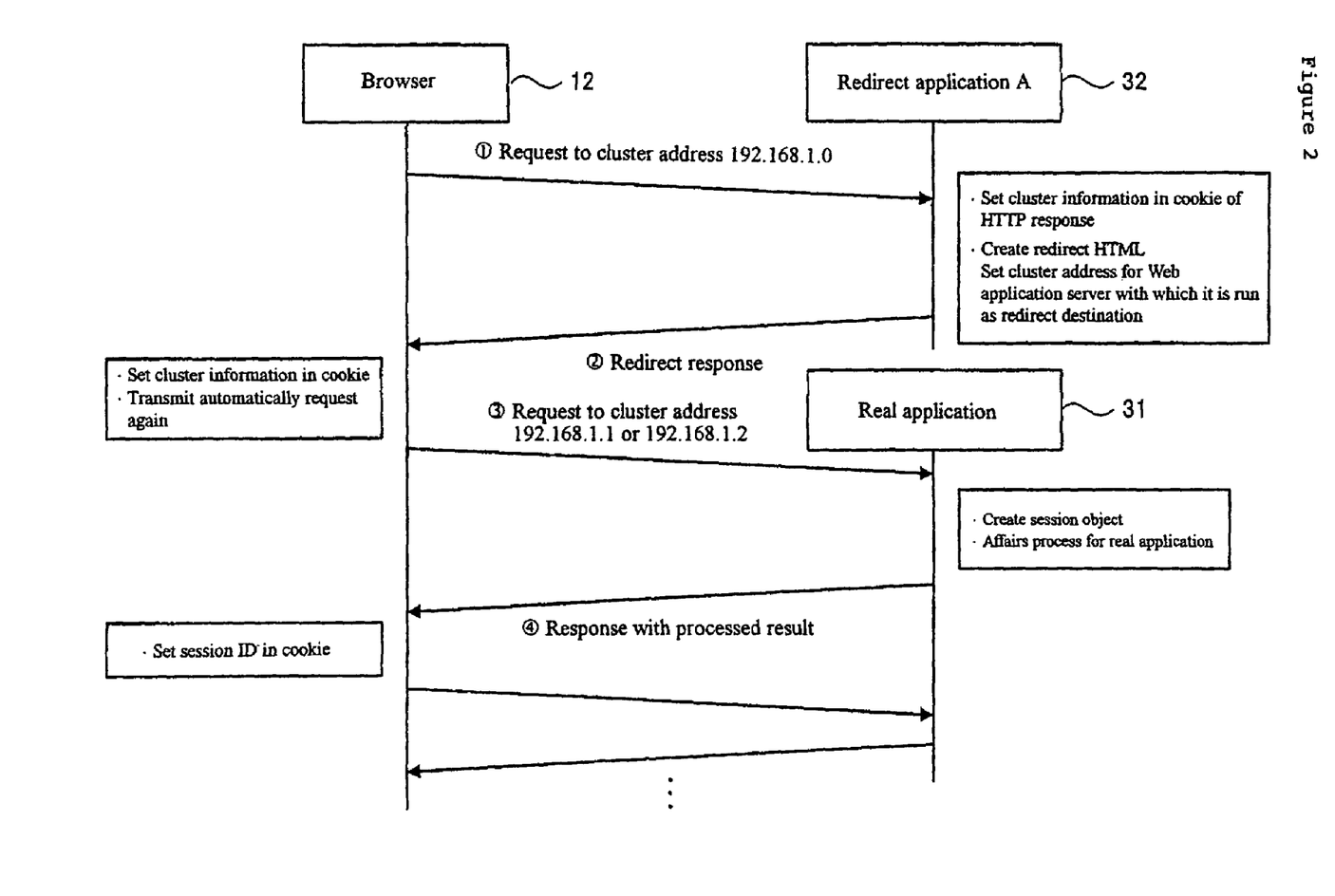
FIG. 2 is a diagram showing an operation of a redirect application (redirect application A) in response to a first request for a session and the corresponding operation of a browser.

FIG. 2 is a diagram showing an operation of the redirect application 32 (redirect application A) in response to a first request for session and the corresponding operation of the browser 12.

In FIG. 2, first of all, in $\hat{1}$ Request to the cluster address 192.168.1.0, an HTTP request transmitted from the browser 12 to URL 9.100.1.1/cluster0 after the user authentication is converted into the cluster address 192.168.1.0 destination by the authentication server 21 and further distributed to the real address 192.168.0.1 or 192.168.0.2 by the load balancing server 22. The HTTP request initiates the redirect application A in the redirect application 32 (servlet or program initiated from the servlet), but contains the information specifying the real application 31 (servlet or program initiated from the servlet) as its argument or the argument information needed by the logic of the real application 31. The HTTP request of 1 is processed by the redirect application A on the Web application server 23 to which this request is actually dispatched to create $\hat{2}$ a redirect response. The redirect process by the redirect application 32 can be implemented by a Location header of the HTTP, the HTML response describing in Meta tag, or the HTML response containing Java® Script automatically executed.

In the response with the Location header, a special header as the Location header is set in a response header part in which the redirect application 32 returns the response. As the value of this header, the URL of the redirect destination is described, whereby the browser 12 having received the response makes automatically the redirect. In the response with Meta tag, the Meta tag with META HTTP-EQUIV="Refresh" designated is described in a response body part (HTML) into which the redirect application 32 returns the response. The redirect destination URL is described with a CONTENT attribute as shown below.
<META HTTP-EQUIV="Refresh" CONTENT="URL=http://xyz.com/">

Also, in the response with Java® Script, Java® Script to be executed immediately after displaying the browser screen is described in a response body part (HTML) into which the redirect application 32 returns the response. A description of jumping to the redirect destination URL is embedded in Java® Script. With this method, the redirect is enabled.

In the processing $\hat{2}$ as shown in FIG. 2, the redirect application A reads the cluster information (cluster address at which the application itself is initiated) described in the configuration file for each Web application server 23, and embeds the cluster address for the real application 31 in the redirect response. The arguments necessary for the logic of the real application 31 are also embedded directly in the redirect response. Also, the redirect application A sets the cluster information read from the configuration file as a cookie in a Set-Cookie header within the header of the redirect response. In a process where the redirect response is returned via the authentication server 21 to the browser 12, the Path attribute in the Set-Cookie is changed, and the information indicating a request-time cluster such as "/cluster0" is added. (This means that Path attribute in Set-Cookie response header is changed from "/" to "/cluster0".) The Path attribute is the information used for privacy protection on the side of the browser 12. For example, the cookie having the Path attribute "cluster0" is only appended to the request in the format of 9.100.1.1/cluster0/ . . . .

In $\hat{3}$ Request to the cluster address 192.168.1.1 or 192.168.1.2 (once the first request is dispatched to either 1.1 or 1.2, later request should be sent to the same address) as shown in FIG. 2, the HTTP request is automatically transmitted to the real application 31 by the browser 12 having received the redirect response, in accordance with the contents of the response. Owing to the offset by the redirect application A, the transmission destination (URL) of the request is 9.100.1.1/cluster1/ . . . or 9.100.1.1/cluster2/ . . . .

The destination address is converted into the cluster address 192.168.1.1 or 192.168.1.2 by the authentication server 21, and then dispatched to the real address 192.168.0.1 or 192.168.0.2 by the load balancing server 22. At the same time, in the browser 12, the content (value or attribute) of the cookie transmitted in ② of FIG. 2 is saved in the memory or file on the client side.

In ④ Response with processed result as shown in FIG. 2, it is unnecessary to change the real application 31. The real application 31 processes the received HTTP request and returns a conventional response. The information inherited to the next HTTP request process is set by creating a session object, as needed. The session ID for identifying the session object is created by the Web application server 23 and set in the Set-Cookie header of the header in the response with processed result. The Path attribute ("/cluster1" or "/cluster2" depending on via which cluster address the real application 31 is initiated) is added to this cookie by the authentication server 21. The cookie of the session ID is saved at the browser 12 having received the resultant response. Since then, this session ID is appended to the request transmitted to the same cluster address (address with the Path attribute of cookie matched), whereby the server program can gain access to the session information continually.

Figure 3:
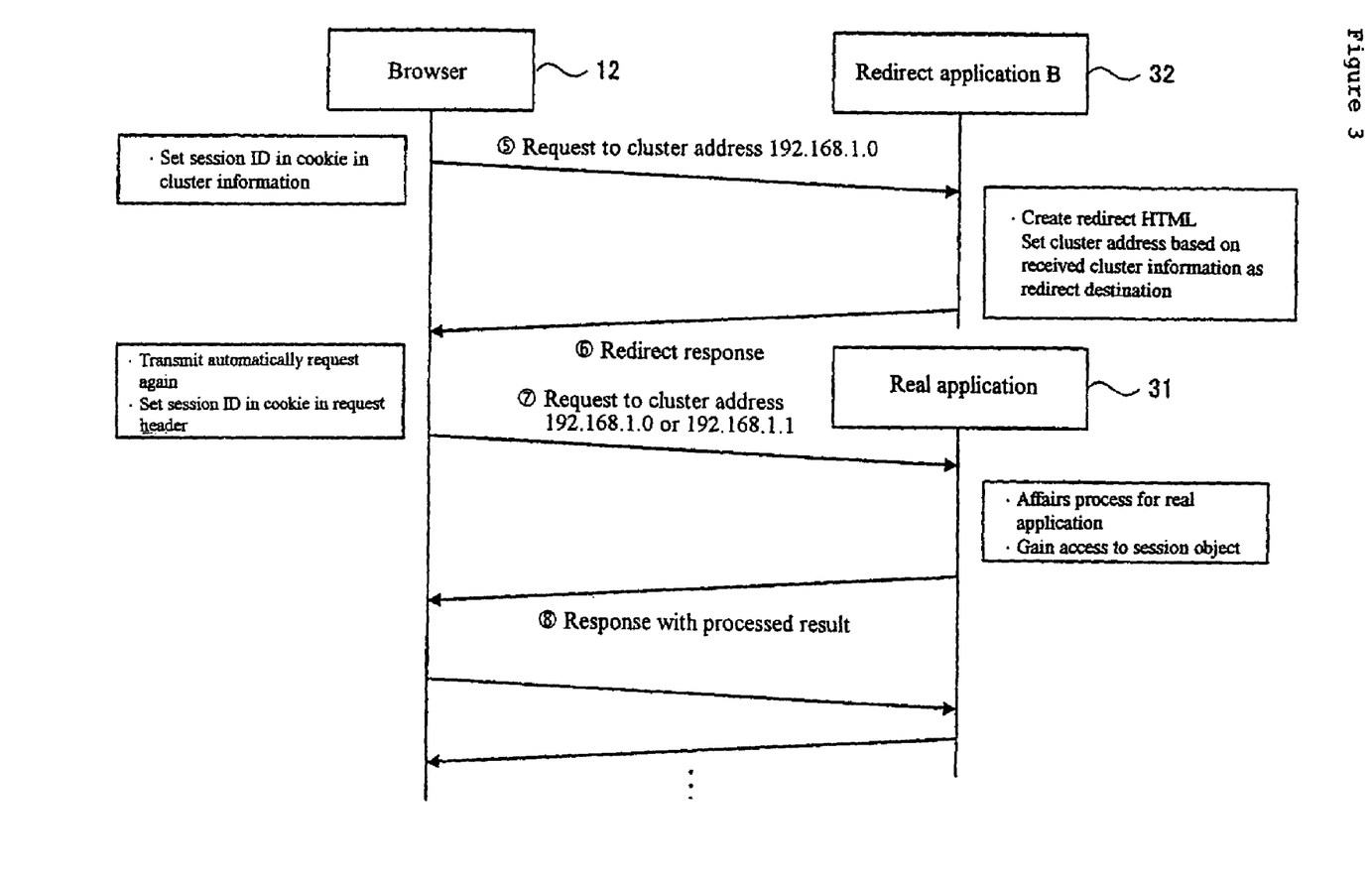
FIG. 3 is a diagram showing an operation of a redirect application (redirect application B) in response to a request in being restored from the other site and the corresponding operation of the browser.

FIG. 3 is a diagram showing an operation of the redirect application 32 (redirect application B) in response to a request in being restored from the other site 11 and the corresponding operation of the browser 12. After the operation ④ as shown in FIG. 2, there are repetitive requests and responses between the self site 10 and the browser 12. Thereafter, the HTTP request is transmitted to the other site 11, followed by repetitive requests and responses to and from the other site 11, in which the request transmitted to the self site 10 through the link in the HTML received from the other site 11 corresponds to ⑤ as shown in FIG. 3.

In ⑤ Request to the cluster address 192.168.1.0 the HTTP request transmitted to URL9.100.1.1/cluster0 designated from the other site 11 is converted into the cluster address 192.168.1.0 destination by the authentication server 21, and further distributed to the real address 192.168.0.1 or 192.168.0.2 by the load balancing server 22. The HTTP request initiates the redirect application B, but contains, as its arguments, the information specifying the real application 31 or the argument information required by the logic of the real application 31.

This request has a path part "/cluster0", whereby the information of the session ID set in the cookie in ④ of FIG. 2 is not transmitted from the browser 12. Namely, the redirect application B can not gain access to the session information which is operative in the self site 10 previously. However, because the cookie of the cluster information transmitted in ② of FIG. 2 has the matched Path attribute, the cluster information is set in the request header and transmitted to the server side. The redirect application B can know via which cluster address the real application 31 should be initiated to gain access to the previous session information.

The HTTP request of ⑤ is processed by the redirect application B on the Web application server 23 to which the request is actually dispatched to create the ⑥ redirect response. The redirect application B embeds the cluster address of the real application 31 in the redirect response, employing the cluster information read from the received request header. The arguments required for the logic of the real application 31 are also embedded directly into the redirect response.

The browser 12 having received the redirect response transmits automatically the HTTP request to the real application 31 in accordance with the contents of the response. The transmission destination cluster address of the request is the same with the request in ⑦ cluster address 192.168.1.1 or 192.168.1.2 as at the time of request in ③. Because the Path information is matched with the Path attribute of the cookie set in ④ of FIG. 2, the session ID is set in the request header and transmitted to the server side. In ⑧ Reply with processed result in FIG. 3, the real application 31 makes access to the session object with the received session ID as a key, and after execution of an affair logic, returns the result to the browser 12.

Then, the processing in the redirect application 32 will be described below.

Figure 4:
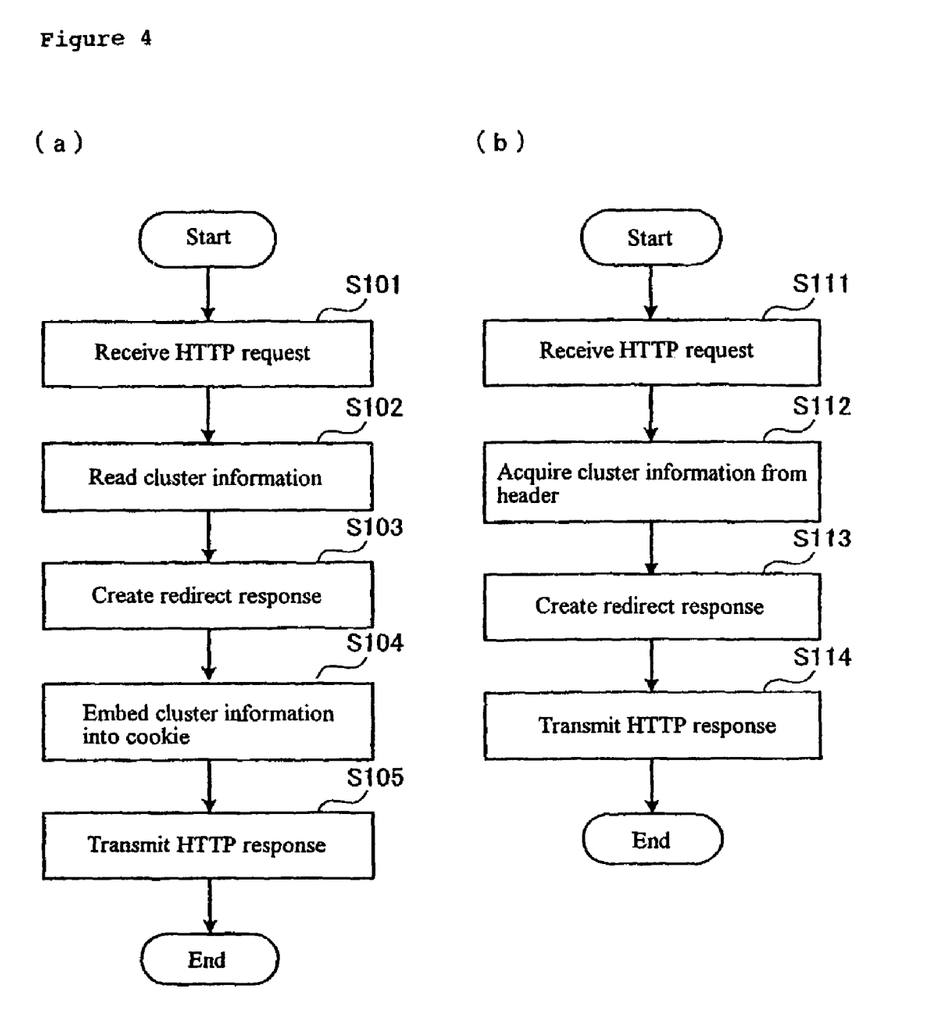
FIGS. 4A and 4B are flowcharts showing the processes that are performed in the redirect application.

FIGS. 4A and 4B are flowcharts showing processes to be executed in the redirect application 32. FIG. 4A shows a process for the redirect application A and FIG. 4B shows a process for the redirect application B.

As shown in FIG. 4A, first of all, the redirect application A having received the HTTP request extracts and saves the associated parameters (step 101). Then, the information of the cluster address to be redirected is read from the configuration file of each Web application server 23 on which the redirect application 32 is operating (step 102). Then, the redirect application A creates a redirect response for initiating the real application 31, employing the information of the parameters and the cluster address received upon the HTTP request (step 103). Thereafter, a Set-Cookie header is set in the header part of the HTTP response, and the cluster information is embedded into the cookie (step 104). And the redirect response that is prepared as the HTTP response is transmitted to the browser 12 (step 105), and the process of the redirect application A is ended.

In the process of the redirect application B, first of all, the HTTP request is received, and the associated parameters are extracted and saved (step 111). Then, the information of the cluster address is acquired from the cookie set in the header part of the received HTTP request (step 112). Then, a redirect response for initiating the real application 31 is created, employing the information of the parameters and the cluster address received upon the HTTP request (step 113). And the redirect response that is prepared as the HTTP response is transmitted to the browser 12 (step 114), and the process of the redirect application B is ended.

In this manner, in this embodiment, the cluster address of the real application 31 is embedded in the redirect response on the server side, whereby the browser 12 having received the response can make the redirect for automatically transmitting the request to this cluster address. More specifically, this "embedding" means that the cluster address is described in the HTTP header such as Java® Script or Location.

Also, the cluster information as a cookie is set in the Set-Cookie header of the header for the redirect response on the server side, whereby the browser 12 having received the response stores this cluster information as a cookie in a memory or disk within the personal computer (PC). Since then, when the request is transmitted to the server, the browser 12 appends the stored cluster information as a part of the request data.

Figure 5:
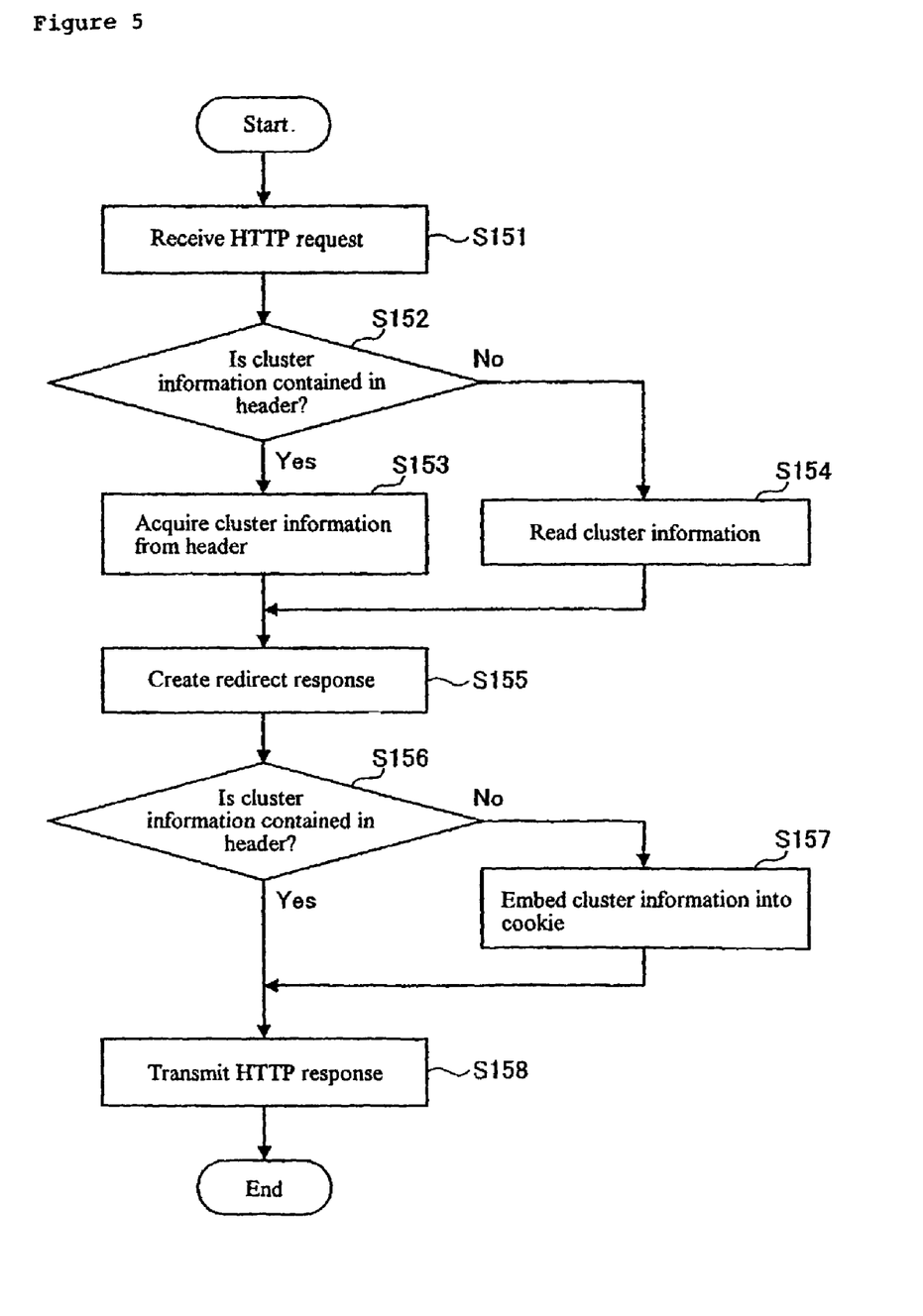
FIG. 5 is a flowchart showing an automatic determination process for determining whether the redirect application A or the redirect application B is run in the redirect application.

FIG. 5 is a flowchart showing an automatic determination process for determining whether the redirect application A or the redirect application B is run in the redirect application 32. First of all, an HTTP request is received, and the associated parameters are extracted and saved (step 151). Then, it is checked whether or not the cluster information as a cookie is embedded into the header part of the received HTTP request (step 152). If it is embedded, the cluster information from the header is acquired, and the information is employed as the cluster address (step 153). When it is not embedded as the cookie, the information of the cluster address is read from the configuration file of the server (step 154). Using the information of the cluster address obtained in this way, a redirect response for initiating the real application 31 is created (step 155). Herein, it is determined whether or not the cookie indicating the cluster information is set in the header part of the received HTTP request (step 156). When it is not set, the information is set as a cookie in the header part of the response (step 157), and the HTTP response is transmitted to the browser 12 (step 158). Thereby, the process is ended.

With this embodiment, in a system configuration using a combination of the authentication server 21 and the load balancing server 22 on an IP layer basis, the session information can be inherited in a transition from the self site 10 to the other site 11 to the self site 10. Also, in a system configuration using the authentication server 21 of the reverse proxy type, an application scenario in which the browser is moved from the self site 10 to the other site 11, and moved back to the self site 10 again, is expected to increase in the future, along with the higher and more complex Web application. Also, in the Web site of the company, the use of the load balancing server 22 is indispensable from the viewpoint of reliability or scalability. Accordingly, it is considered that the problem of inheriting the session information will often arise in the future, and this embodiment to solve this problem is very valuable.

As a cooperative scenario between the Web sites (self site 10 and other site 11) according to this embodiment, for example, it is conceived that the user moves from a Web site (self site 10) of an insurance company to a bank site (other site) where the user makes a loan on security of one's insurance to make a payment, and gets back to the Web site (self site 10) of the insurance company again to continue the operation. In such scenario, even if the user once moves to the bank site (other site 11), and then transfers to the Web site (self site 10) of the insurance company, the insurance contract operation can be continued.

For example, there is a scenario where after a commodity is put in a shopping bag at a site (self site 10) in the shopping mall, the user transfers to another site (other site 11) of a credit company to confirm a schedule of withdrawal, and then is restored to the site (self site 10) in the shopping mall to carry out a purchase procedure. At this time, with this embodiment, in a system configuration in which the site (self site 10) of the shopping mall employs a combination of the authentication server 21 and the load balancing server 22 on an IP layer basis, the session information is enabled to be inherited when being restored from the other site 11 to the site (self site 10) in the shopping mall, whereby the operation can be smoothly continued even after transiting through a plurality of sites.

Moreover, another scenario is applicable in which when making a reservation of the travel, the user moves to the site (other site 11) relevant with the hotels or inns halfway on the procedure of the site (self site 10) for making reservations of the transport facilities to make sure of the reservation, and then decides finally the reservation of the transport facilities at site (self site 10) for making reservations of the transport facilities. Then, with this embodiment, in a system configuration having a load balancing function at site (self site 10) for making reservations of the transport facilities, the session information is enabled to be inherited even in the case of transiting to the self site 10 after transferring to the other site 11 related with the reservation of the travel, whereby the reservation operation at site (self site 10) for making reservations of the transport facilities can be continued.

We claim:

1. A method of inheriting session information when a client browser is piloted from one web application server of a plurality of web application servers of one web site to another web site, and back to the one web application server of the plurality of web application servers of said one web site, the method comprising:

receiving by an authentication server of the one web site an initial request to access the one web site by the client browser, the authentication server presenting one IP address to the client browser for accessing the one web site, and the authentication server further authorizing the initial request;

forwarding, by the authentication server, the initial request via a first cluster address of a plurality of cluster addresses to a load balancing server of the one web site, the plurality of cluster addresses being cluster addresses of the load balancing server, and wherein requests received at the load balancing server via the first cluster address are forwarded by the load balancing server to one web application server of the plurality of web application servers according to a load balancing strategy, the load balancing server selectively addressing each web application server of the plurality of web application servers of the one web site, each web application server of the plurality of web application servers comprising a web application, a first redirect application and a second redirect application, the first redirect application accepting requests to begin a web application session, and the second redirect application accepting requests to restore a web application session upon return by the client browser to the one web site;

dispatching, by the load balancing server, the initial request to the one web application server of the plurality of web application servers of the one web site;

subsequent to receipt of the initial request at the one web application server, generating via a first redirect application executing on the one web application server a redirect response setting therein a second cluster address of the plurality of cluster addresses of the load balancing server for redirecting the client browser on the basis of the second cluster address, the second cluster address being a virtual address of the load balancing server, the second cluster address being associated by the load balancing server with the one web application server, and the load balancing server directing requests addressed to the second cluster address through the load balancing server to the one web application server;

transmitting the redirect response comprising the set second cluster address to the client browser;

responsive to receipt of the redirect response at the client browser, setting at the client browser the second cluster address in a cookie associated with the one IP address of the authentication server; and receiving another request from the client browser, the client browser having been piloted back to the one web site from the another web site, the another request comprising the cookie associated with the one IP address, the another request being forwarded by the load balancing server via the first cluster address to another web application server of the plurality of web application servers, the another web application server, on the basis of receiving the cookie comprising the second cluster address, executing the second redirect application to generate another redirect response for redirecting the client browser via the second cluster address back to the one web application server for resuming the web application session, wherein the another redirect response, when received by the client browser, causes an automatic browser refresh to redirect the client browser via the second cluster address back to the one web application server.

2. The method of inheriting session information according to claim 1, further comprising:
acquiring, by the another web application server, the second cluster address from the received cookie; and
recognizing, by the another web application server, which cluster address of the load balancing server was redirected responsive to the initial request to the one web site, on the basis of the acquired second cluster address.

3. A method of inheriting session information, comprising:
receiving an HTTP request for one web site employing an authentication server through which HTTP requests are received, the authentication server presenting one IP address for accessing the one web site;
authenticating the HTTP request at the authentication server;
subsequent to authentication of the HTTP request at the authentication server, forwarding the HTTP request via a first cluster address of a plurality of cluster addresses from the authentication server to a load balancing server of the one web site, the plurality of cluster addresses being cluster addresses of the load balancing server;
forwarding the HTTP request from the load balancing server to one web application server of a plurality of web application servers, the load balancing server selectively addressing each web application server of the plurality of web application servers, wherein requests received at the load balancing server via the first cluster address are forwarded by the load balancing server to one web application server of the plurality of web application servers according to a load balancing strategy, each web application server of the plurality of web application servers comprising a web application, a first redirect application and a second redirect application, the first redirect application accepting requests to begin a web application session, and the second redirect application accepting requests to restore a web application session upon return by the client browser to the one web site, and wherein subsequent to the forwarding the HTTP request to the one web application server, a web application session is commenced;
reading, by the first redirect application of the one web application server, cluster address information from a configuration file of the one web application server, the configuration file comprising the plurality of cluster addresses of the load balancing server, and obtaining a second cluster address of the plurality of cluster addresses from the configuration file, the second cluster address being uniquely associated with the one web application server;
generating, via a first redirect application executing on the one web application server a redirect response setting therein a second cluster address of the plurality of cluster addresses of the load balancing server for redirecting the client browser on the basis of the second cluster address, the second cluster address being a virtual address of the load balancing server, the second cluster address being associated by the load balancing server with the one web application server, and the load balancing server directing requests addressed to the second cluster address through the load balancing server to the one web application server;

setting the second cluster address of the plurality of cluster addresses of the load balancing server as a cookie in the redirect response;
transmitting the redirect response comprising the cookie to a client browser initiating the HTTP request; and
receiving another HTTP request from the client browser, the client browser having been piloted back to the one web site from another web site and the another HTTP request being a request to resume the web application session, the another HTTP request comprising the cookie, the another HTTP request being forwarded by the load balancing server via the first cluster address to another web application server of the plurality of web application servers, the another web application server, on the basis of receiving the cookie comprising the second cluster address, executing the second redirect application to generate a new redirect response for redirecting the client browser via the second cluster address back to the one web application server for resuming the web application session, wherein the new redirect response, when received by the client browser, causes an automatic browser refresh to redirect the client browser via the second cluster address back to the one web application server.

4. The method of inheriting session information according to claim 3, further comprising:
receiving the another HTTP request from said the client browser piloted from another web site, wherein the another web site is separate from the one web site; and
acquiring, by the another web application server, the second cluster address from the cookie received with the another HTTP request, wherein the generating the new redirect response comprises employing the acquired second cluster address; and
transmitting the new redirect response to the client browser.

5. A method of inheriting session information, comprising:
receiving an HTTP request for a web site employing an authentication server through which HTTP requests are received, the authentication server presenting one IP address for accessing the web site;
authorizing the HTTP request at the authentication server;
forwarding, by the authentication server, the HTTP request via a first cluster address of a plurality of cluster addresses to a load balancing server of the one web site, the plurality of cluster addresses being cluster addresses of the load balancing server;
subsequent to authorization of the HTTP request at the authentication server, checking at the load balancing server of said web site whether cluster address information of the load balancing server of the web site is embedded in a cookie for the received HTTP request, the cluster address information comprising a load balancing server cluster address of the plurality of cluster addresses;
forwarding the HTTP request from the load balancing server to a web application server of the web site, the forwarding being on the basis of the cluster address information, if a cookie was received with the HTTP request, or on the basis of a load balancing strategy, if a cookie was not received with the HTTP request, the web site comprising a plurality of web application servers, each web application server of the plurality of web application servers comprising a web application, a first redirect application and a second redirect application, the first redirect application accepting an initial request forwarded through the authentication server and the load balancing server to begin a web application session, and the second redirect application accepting a subsequent request forward through the authentication server and the load balancing server to restore a web application session upon return from another website;

performing one of generating, via a second redirect application executing on one web application server of the web site, a redirect response at the web site employing the cluster address information, if the cluster address information is embedded in the HTTP request, or, if the cluster address information is not embedded, generating, via a first redirect application executing on the one web application server of the web site a redirect response setting therein a second cluster address of the plurality of cluster addresses of the load balancing server for redirecting the client browser on the basis of the second cluster address, wherein the redirect response, when received by the client browser, causes an automatic browser refresh to redirect the client browser on the basis of the second cluster address, the second cluster address being a virtual address of the load balancing server, the second cluster address being read cluster information from a configuration file of the one web application server and being uniquely associated by the load balancing server with the one web application server, and the load balancing server directing requests addressed to the second cluster address through the load balancing server to the one web application server;

setting the cluster address information or the read cluster information as a new cookie in the redirect response; and transmitting the redirect response from the web site to a browser initiating the HTTP request.

6. A system of inheriting session information when a client browser is piloted from one web application server of a plurality of web application servers of one web site to another web site, and back to the one web application server of the plurality of web application servers of the one web site, the system comprising:

an authentication server at the one web site, the authentication server authorizing a request from a client browser, and presenting one IP address to the client browser for the one web site, the authentication server forwarding the request via a first cluster address of a plurality of cluster addresses to a load balancing server of the one web site, the plurality of cluster addresses being addresses of the load balancing server, and wherein requests received at the load balancing server via the first cluster address are forwarded by the load balancing server to one web application server of the plurality of web application servers according to a load balancing strategy, the load balancing server selectively addressing each web application server of the plurality of web application servers of the one web site, each web application server of the plurality of web application servers comprising a web application, a first redirect application and a second redirect application, the first redirect application accepting requests to begin a web application session, and the second redirect application accepting requests to restore a web application session upon return by the client browser to the one web site;

wherein the first redirect application executing on the one web application server of the one web site generates a redirect response setting therein a second cluster address of the plurality of cluster addresses of the load balancing server for redirecting the client browser on the basis of the second cluster address, the second cluster address being a virtual address of the load balancing server, the second cluster address being read cluster information from a configuration file of the one web application server and being uniquely associated by the load balancing server with the one web application server, and the load balancing server directing requests addressed to the second cluster address through the load balancing server to the one web application server;

wherein, responsive to receipt of the redirect response at the client browser, the client browser sets the second cluster address in a cookie associated with the one IP address of the authentication server; and wherein the authentication server of the one web site receives another request from said client browser, the client browser having been piloted back to the one web site from the another web site, the another request comprising the cookie associated with the one IP address, the another request being forwarded by the load balancing server via the first cluster address to another web application server of the plurality of web application servers, the another web application server, on the basis of receiving the cookie comprising the second cluster address, executing the second redirect application to generate another redirect response for redirecting the client browser via the second cluster address back to the one web application server for resuming a web application session, wherein the another redirect response, when received by the client browser, causes an automatic browser refresh to redirect the client browser via the second cluster address back to the one web application server.

* * * * *